Oct. 31, 1933.  M. W. TEBYRIÇA  1,932,564
PIPE AND TUBULAR BODY
Filed July 3, 1929   3 Sheets-Sheet 1
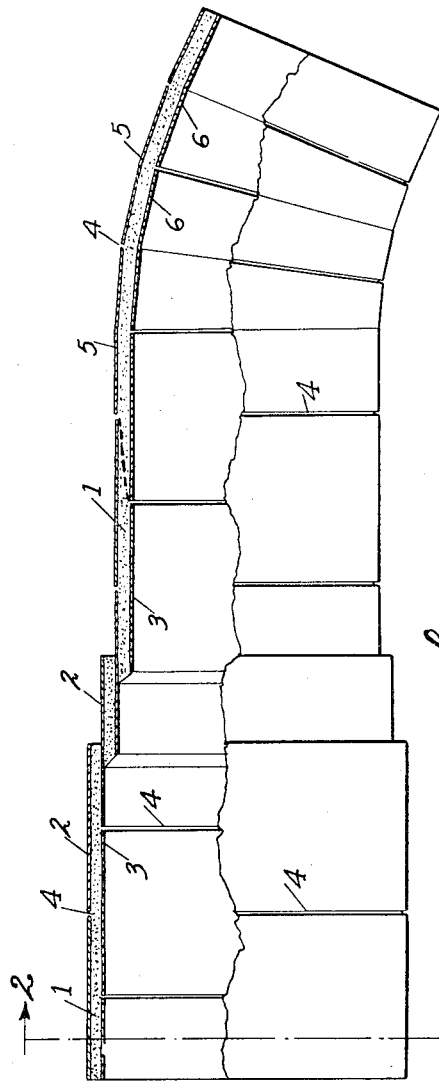
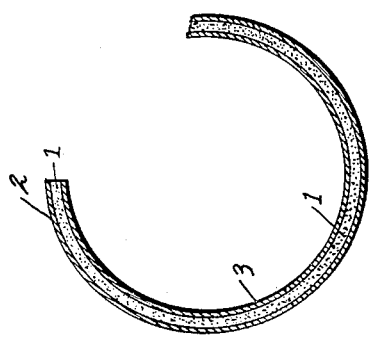
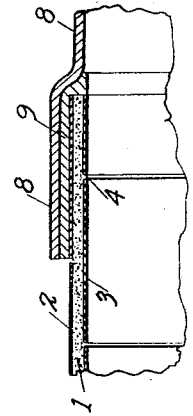
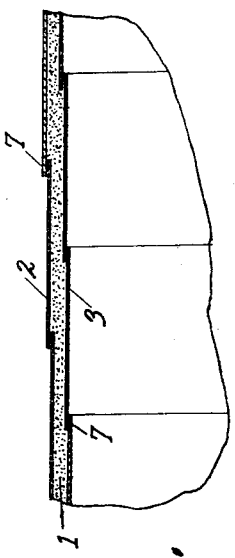
INVENTOR.
Mario W Tebyriça
BY
Allen & Allen
ATTORNEY.

Oct. 31, 1933.   M. W. TEBYRIÇA   1,932,564
PIPE AND TUBULAR BODY
Filed July 3, 1929   3 Sheets-Sheet 3

INVENTOR.
Mario W. Tebyriçá
BY Allen + Allen
ATTORNEYS.

Patented Oct. 31, 1933

1,932,564

UNITED STATES PATENT OFFICE 1,932,564

PIPE AND TUBULAR BODY

Mario W. Tebyriçá, Rio de Janeiro, Brazil, assignor to The American Rolling Mill Company, Middletown, Ohio, a corporation of Ohio Application July 3, 1929. Serial No. 375,621

3 Claims. (Cl. 72—52)

This application is a continuation in part of application Serial No. 225,960, filed by me Oct. 13, 1927.

My invention relates to the production of pipes, tubular vessels, cylindrical shells, and like objects and devices, formed of rings or strakes of sheet metal, bound together with cement, concrete, bituminous compound, or ceramic or other workable material.

Particularly in the production of concrete pressure pipes, tanks, stand pipes and the like, the metal reinforcement of the concrete body is an expensive and complicated thing; and in order to render the structures water tight, the walls have had to be made of excessive thickness, resulting in a high cost of material, labor and transportation, which it is one of the objects of the present invention to overcome.

In its essence, the invention is directed to forming a pipe of two or more concentric series of circular bands or strakes, which are so assembled as to be staggered in concentric formation, and bound together by a compact filling of the annular spaces therebetween with a suitable cementitious material, preferably Portland cement mortar. As will hereinafter be pointed out, this sets up a tortuous path for the escape of any fluid, within the pipe, or any continuous break in the body. This construction very greatly increases the effectiveness of my pipes or tubular bodies, enabling them with safety to have much thinner walls, making them much cheaper and easier to manufacture, and causing them to give better service than the known types of reinforced concrete structures. My pipes are adapted for continuous construction in the field, where they may be reduced or increased in diameter and in thickness, and curved in any direction, as will hereinafter be more fully explained, without interrupting the process of continuous construction.

In the case of pipes subject to external or earth pressure, which may in many instances exceed the internal pressure, no extra metal has to be added beyond that strictly necessary to withstand the internal pressure, because the cement will have the compressive strength necessary to withstand the external pressure when the pipe is empty. But it is to be pointed out that my construction differs radically from reinforced concrete construction in this: that the metal strakes are intended (and in practice are estimated) to withstand the whole of the internal bursting pressure, while, in this aspect, the cement performs the secondary function of a filler for caulking the annular spaces between the strakes, although at the same time it serves to stiffen the shell. In other words, my construction is primarily a metallic pipe or other object caulked with cementitious substance, rather than a pipe of cementitious substance reinforced with metal.

In the construction of the pipes of my invention, no moulds are required, since the outer and inner series of rings form a casing for the cement, which may be injected into the annular spaces therebetween with a gun, or other suitable means to unite the laminate structure into a solid, unitary body. An approved method of field construction comprises transporting the sheets or plates to the site already cut to proper sizes, bundled in flat form, or sheared to the proper width only, and transported in coils, depending upon the character and gauge of the material. The sheets are then formed in a portable plant into rings or strakes of the desired diameters and assembled in the trench in concentric formation, the inner strakes being well centered and the other strakes held in position by clips or spacers of any suitable material and form. As the assembly of the strakes progresses in the field, in units corresponding to the width of the strakes, the cement is applied and the centering removed as the cement goes on setting.

In the course of construction, as the hydraulic pressure increases or diminishes along the pipe line, the quantity of metal can be accordingly increased or reduced either by using thicker or thinner sheets or plates, or by increasing or reducing the number of strakes in the case of pipes having three or more tiers or series of strakes, the outer and inner strakes may be made thicker than the inside strakes and galvanized or dipped in a bituminous solution to afford protection against corrosion. If desired, the pipe may be protected against corrosion by a cement lining within and a concrete jacket outside, in which case no galvanizing or dipping will be necessary. The seams of the strakes may be welded or riveted or effected in any other desired way.

It will be noted that my invention represents an economy of metal as compared with all metal pipes, since no lapping is required for circumferential joints, the strakes being simply butted end to end and even spaced a little apart, as shown in the accompanying drawings. Besides this, it will be evident that the total combined thickness of the strakes has a greater tensile strength than that of a single plate of the same thickness, due to my construction.

Cast iron or steel valves or fittings, such as reducers, T's, sharp bends and the like, can easily be connected to my metal pipe by providing such fittings with adequate sockets on both ends and building them into the composite structure.

The attainment of these objects and of others which will be pointed out hereinafter or will be apparent to one skilled in the art upon reading this specification, I accomplish by that certain construction and arrangement of parts and in that process of which I shall now describe several preferred embodiments in greater detail, reference being had to the accompanying drawings which form a part of this specification.

In the drawings:

Figure 1 is an elevation partly in section of a two tier pipe.

Figure 2 is a cross section of the same pipe taken along the line 2—2 of Figure 1 and partly broken off to correspond to the respective side view.

Figure 3 is a longitudinal section of a two tier pipe wall showing a modified form of assembling the strakes.

Figure 4 shows a simple method of connecting the pipe to all metal fittings.

Figure 5:
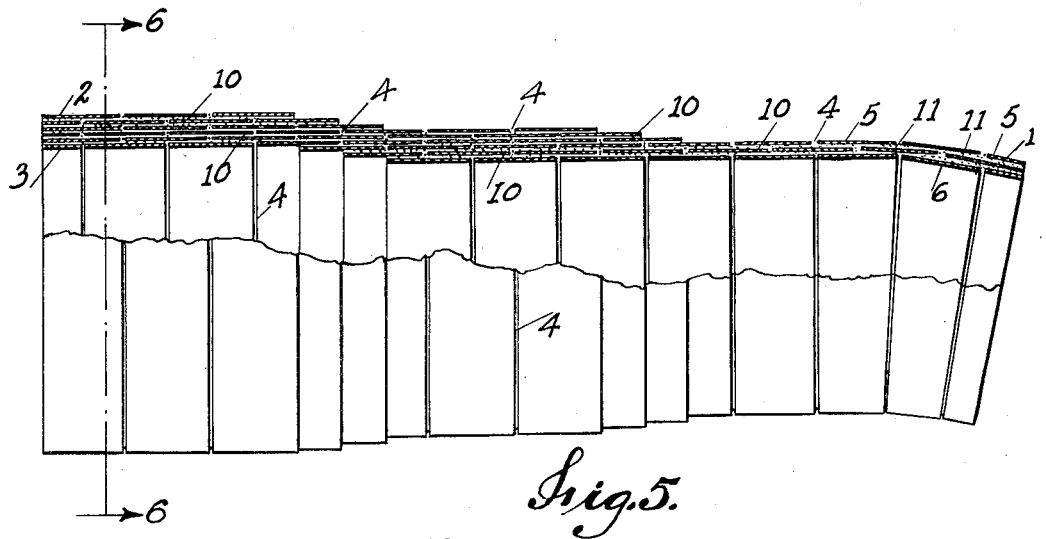
Figure 5 is a side elevation of a pipe having more than two tiers, part of the view being broken away to show a wall in section.

In Figure 1 the cement filling is illustrated at 1 and the series or tiers of metal strakes are two in number, formed of the outer strakes 2 and the concentric inner strakes 3. The metal strakes are spaced sufficiently to allow the cement to be well packed between them. The strakes are butted end to end in my preferred construction, but to render the drawings more comprehensible small spaces 4 are shown at the buttings. However, spaces may be left if desired. The outer and inner strakes 2 and 3 are disposed in break joint relation as to the buttings 4, not only to insure a longitudinal reinforcement of the pipe but also and principally to guard against leakage through the wall, which would have to penetrate diagonally as indicated by the heavy dotted line in Figure 1, thus rendering the thickness of the wall practically equivalent to the diagonal distance between the two nearest inner and outer buttings, so far as leakage is concerned. This is a great advantage over any of the known types of reinforced concrete pipes. In reinforced concrete pipes seepage finds its way straight out through the wall by the shortest distance, the reinforcements, although making for strength in the wall, generally having no effect or a detrimental effect upon the penetrability thereof.

Figure 1 also illustrates the method of reducing the diameter of the pipe. This is accomplished in the field by employing strakes of smaller diameters disposed in the form of steps as shown in the drawings. Curves may also be formed in the pipe by means of special outer and inner strakes 5 and 6. In the construction of this type of pipe, the tiers of strakes are properly centered and interspaced and the cementitious material introduced between them. This will most conveniently be done with a gun in the case of cement but may be done by pouring or by an actual caulking operation particularly in the case of cementitious material other than concrete.

Figure 6:
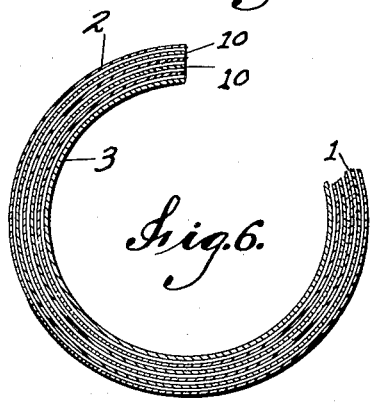
Figure 6 is a cross section of the pipe shown in Figure 5 taken along the line 6—6 in that figure.
Figure 7:
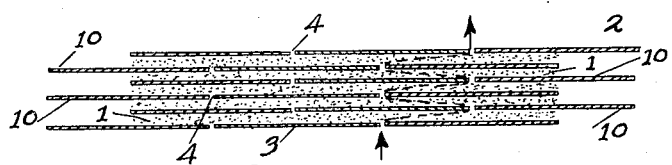
Figure 7 is a section of a wall having more than two tiers of strakes and showing by means of dotted lines the zigzag course that seepage would have to follow therethrough.

It is possible as shown in Figures 3 and 7, to construct a pipe with overlapping strakes and in some instances, this may be found advantageous. When it is desired to join my pipe to a fitting or valve, a convenient way of accomplishing this is to provide the valve or fitting with a long socket 8 on both ends. The interstices 9 between the socket and pipe are then caulked with the cementitious substance used. In many instances it may not be necessary to join the end of the strakes, and this is particularly true where a good bond is secured between the cement and the strakes. The type of construction chosen will, of course, depend largely upon the internal pressure which the structure is designed to withstand. From my experience, cement appears to adhere better to uncoated iron and steel sheets than to iron and steel sheets coated with zinc or with a bituminous coating; but considering the fact that the principal stress exerted in the cement filling is crosswise of the pipe wall, the matter loses some of its importance. It is to be pointed out again that I am not using my strakes as reinforcements for the concrete or other cementitious binder but on the contrary I am caulking a metallic construction with the binder substance. Hence the practicability of coating the inner and outer strakes with zinc or bitumen. Ordinarily however, there will be found considerable advantage in applying an interior and exterior coating of the cement itself, particularly where the construction is carried on with a gun. This will presently be more fully described. Figure 5, of which Figure 6 is a cross section, illustrates a pipe which starts with six tiers of strakes, and after being reduced in diameter by a gradual offsetting of the strakes inwardly, is by a gradual omission of the outer strakes also reduced in wall thickness after which it may be curved by the method already described or otherwise. Figure 5 will further illustrate the greater flexibility which my invention provides in its structural possibilities. It has a greater advantage in that it enables the continuous construction of pipe without joints changing direction in any plane, changing in diameter and changing in thickness and strength as many be required.

The dotted line in Figure 7 illustrates the zigzag path which must be followed for the escape of water through the structure of a six tier pipe. In other words, my pipe is the equivalent of a reinforced concrete construction having a wall thickness many times that of my structure. What is true of leakage is true also of mechanical failure. Since the strakes are arranged in the break joint manner already disclosed, they will define any line of breakage in such a way as to require it to follow the tortuous path noted. If it is to become continuous through the wall, cracks in any other configuration cannot possibly be continuous.

Another question which I believe loses its importance in connection with my invention is that of water ratio in the cement mortar. If due to the small quantity of cement used for filling the annular spaces between strakes, it should be found impossible to apply a cement mixture dry enough to insure a greater strength and durability than is possible with cement mortars containing an excess of mixing mortar, there would be sufficient compensation for this in the enormous factor of safety presented by the distance that water would have to penetrate into the cement before any seepage could occur.

Figure 8:
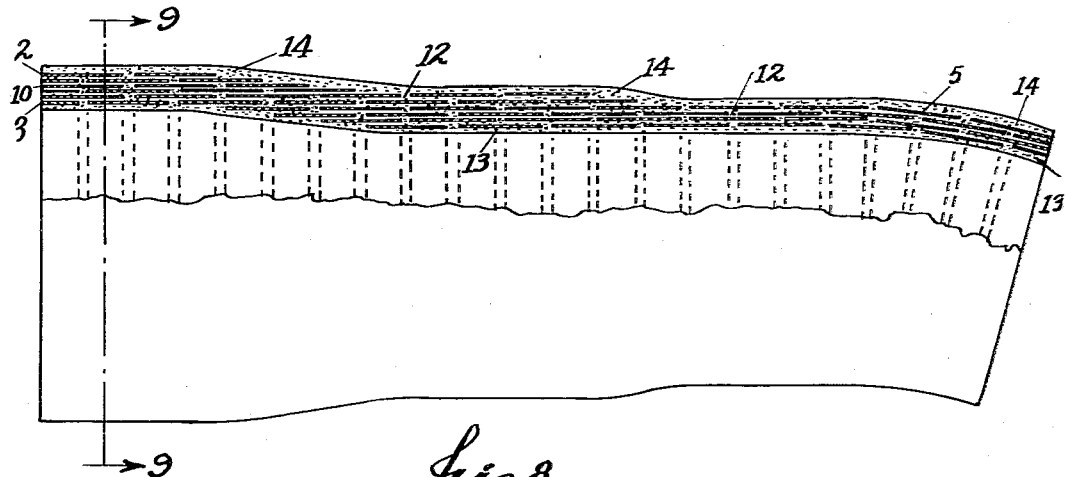
Figure 8 is a side elevation of a pipe lined and coated with cement, also shown partly in section.
Figure 9:
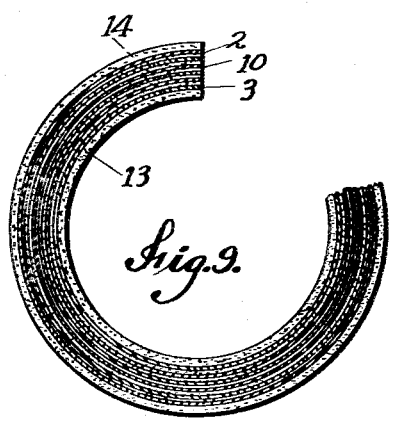
Figure 9 is a cross section along the line 9—9 of Figure 8.

In Figures 5 and 6, the interior strakes, being entirely embedded in cement, need not be coated. The inner and outer strakes may be desired to be coated as described, depending upon the requirements of the particular job. In Figure 8, of which Figure 9 is a cross section taken along the line 9—9, there is shown a modified form of pipe in which all of the strakes including the outer and inner ones are embedded in cement, the strakes being slightly spread apart leaving a small space between the ends, thus presenting a cement lining 13 inside and a cement jacket 14 outside, bonded to the interior filling. This interspacing is not however necessary, and in general a construction of the pipe of Figure 8 does not differ from that of the other figures excepting in an interior or exterior coating of the cementitious substance. The tubes of Figures 1 and 5 to the types shown in Figure 8 by the application at any time of an external and internal coating of cement applied with the cement gun. In this type of pipe all of the strakes may be and preferably are uncoated.

Modifications in my invention may be made by those skilled in the art without departing from the spirit thereof. The width and thickness of the strakes, spacing between them, the number of concentric tiers or series used, and the shape of the strakes will depend on engineering requirements, and it will also be obvious, without illustration, that the strakes can be formed as split rings with the slits in break joint relation. All kinds of tubular objects, circular and otherwise, can be formed following the lines of my invention. The strakes may be corrugated or roughened in any way but I have found that a plane surface is entirely satisfactory. The strakes may be supported temporarily in any desired way while the cement material is applied; and in continuous construction, the continuous addition of strakes of various sizes in proper relation and the binding of them in place with the cementitious material will not present a field problem of any importance. As hereinbefore indicated, the metal parts will be designed to take care of the mechanical resistance to bursting pressure, while the cement binds it together adding to the resistance, and ordinarily the stiffness, as well as making it water tight. With a proper disposal of the strakes, cementitious substance need not necessarily have great compressive strength nor even greater rigidity, it being perfectly possible for a number of uses to construct pipes in accordance with my invention using a binder such as a bituminous compound which may at times not be perfectly rigid.

Having thus described my invention, what I claim is new and desire to secure by Letters Patent, is:

1. A tubular body comprising a plurality of sheets bent into the form of annular elements with the edges of succeeding sheets adjacent each other, said elements being arranged in longitudinal series, certain series lying within and substantially concentric to other series, leaving an annular space continuous around and along said body, each two adjacent elements of each series having their edges close together, and the joint joined by adjacent edges in one series being offset from the corresponding joint in the other series, and material filling said annular space and adhering to the adjacent surfaces of said elements, maintaining the substantially concentric relation as well as the relative longitudinal position of the elements.

2. A tubular body comprising at least three sheets bent into the form of annular elements with the edges of succeeding sheets adjacent each other, said elements being arranged in longitudinal series, certain series lying within and substantially concentric to other series, leaving annular spaces continuous around and along said body, each two adjacent elements of each series having their edges close together, and the joint formed by adjacent edges in one series being offset from the corresponding joint in the other series, and material filling said annular space and adhering to the adjacent surfaces of said elements, maintaining the substantially concentric relation as well as the relative longitudinal position of the elements.

3. A tubular body comprising a plurality of annular elements or bands spaced concentrically from each other in a plurality of series, and spaced lengthwise from each other in each concentric series, the spaces lengthwise in one concentric series being in break joint relation to the spacing in another concentric series, and cement material filling the spaces between the series of bands and binding the same into a unitary construction, whereby each band of any outer series is bound together with two inner bands of the next inner series.

MARIO W. TEBYRIÇÁ.